United States Patent [19]
Sheppard

[11] 3,805,316
[45] Apr. 23, 1974

[54] TRAY DRYING APPARATUS
[75] Inventor: Richard H. Sheppard, Palos Verdes Peninsula, Calif.
[73] Assignee: Purex Corporation, Ltd., Lakewood, Calif.
[22] Filed: June 30, 1972
[21] Appl. No.: 267,919

[52] U.S. Cl.................. 15/306 B, 15/346, 15/353
[51] Int. Cl............................................. A47l 5/38
[58] Field of Search...... 15/302, 303, 306 R, 306 A, 15/306 B, 346, 353; 34/201, 216, 217

[56] References Cited
UNITED STATES PATENTS
2,137,104  11/1938  Zademach.................... 15/306 B X
2,413,937  1/1947  Zademach et al............. 15/306 B X Primary Examiner—Harvey C. Hornsby
Assistant Examiner—C. K. Moore
Attorney, Agent, or Firm—White and Haefliger

[57] ABSTRACT

Tray drying apparatus in which one nozzle means blows rinse water accumulation through the tray bottom openings and a second nozzle means delivers air at a selected angle to the first nozzle air stream and entrained water emerging from the bottom openings, to clear water from the tray bottom, while the trays are being conveyed relative to the nozzles.

13 Claims, 4 Drawing Figures

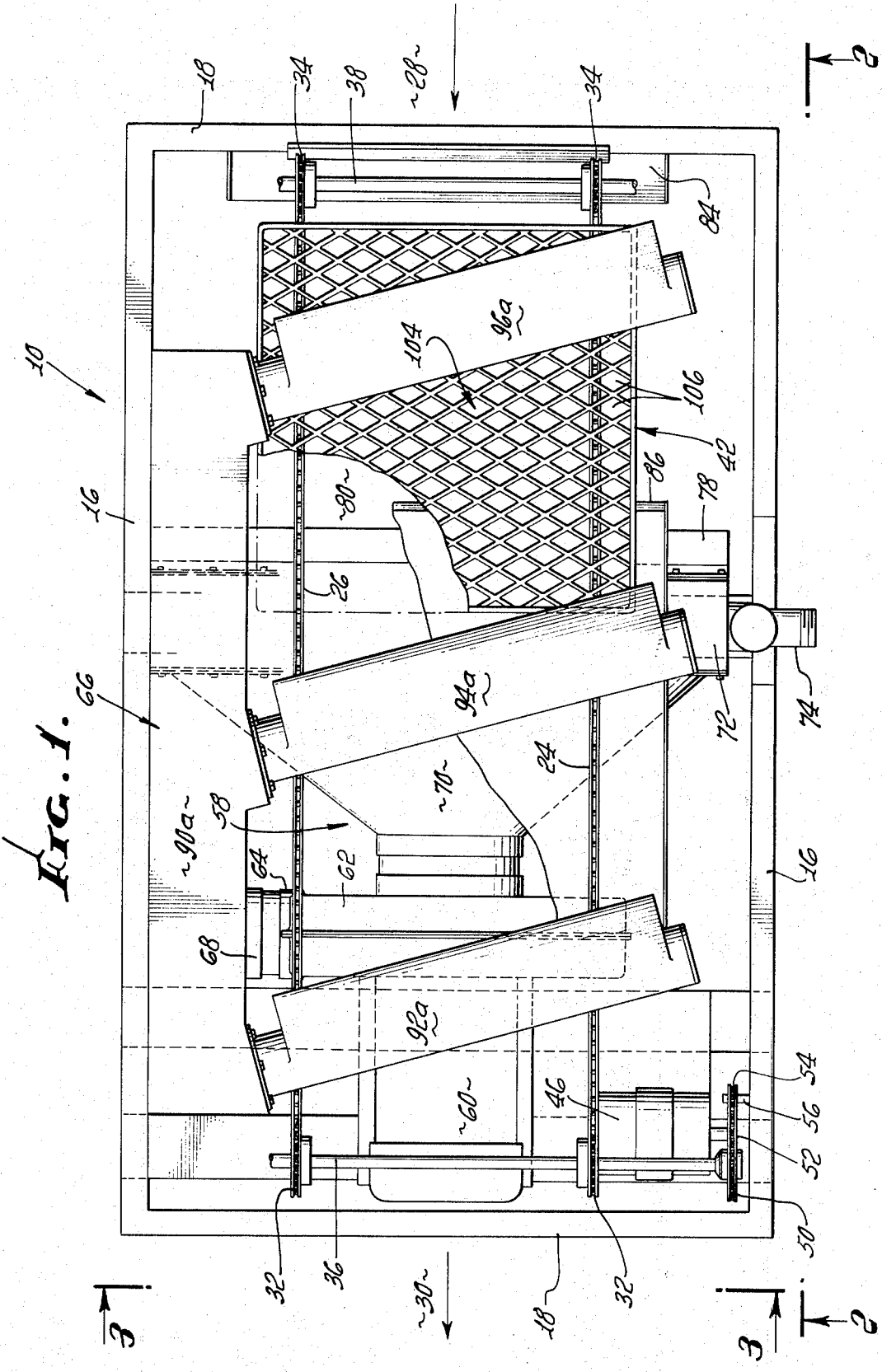

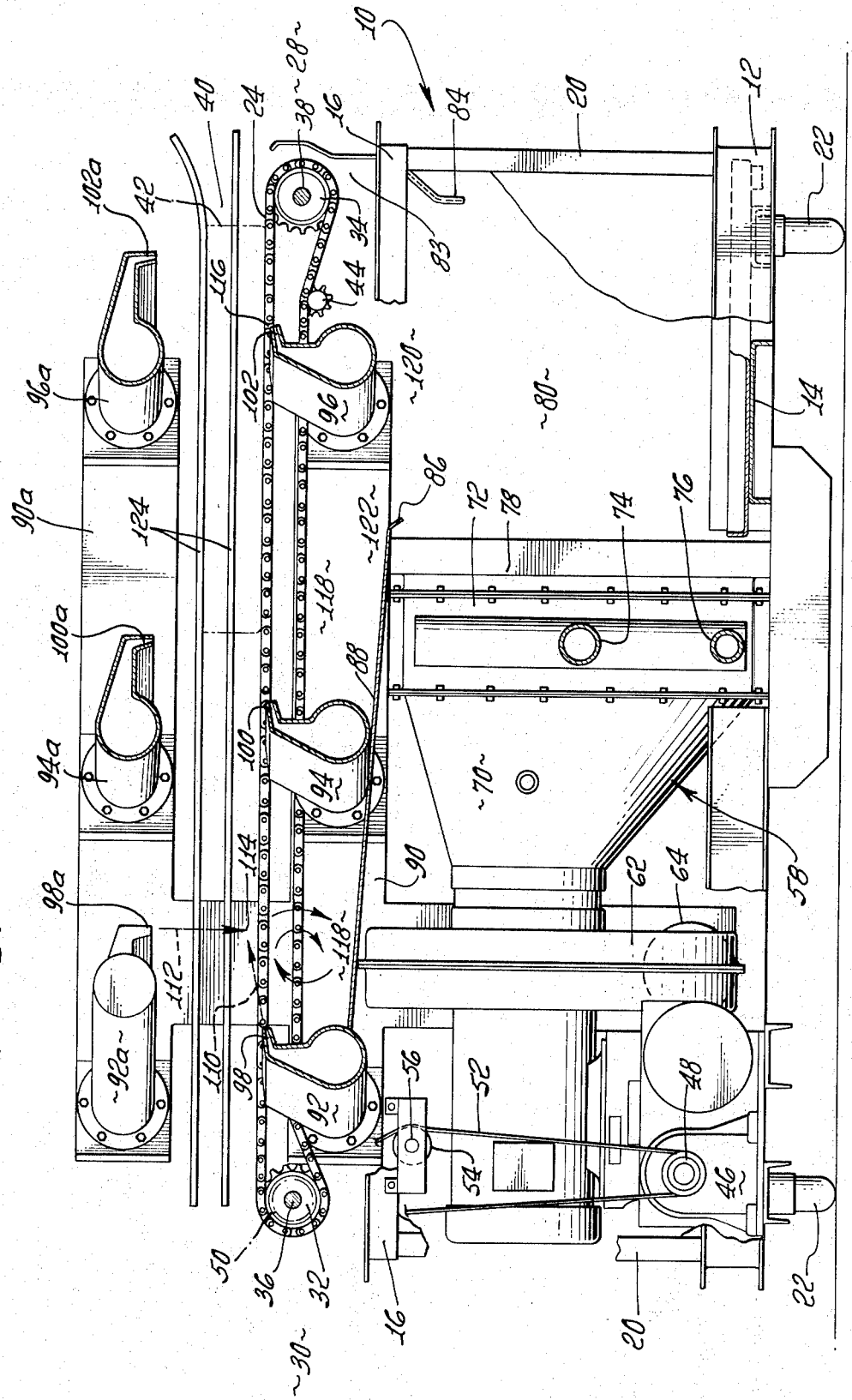

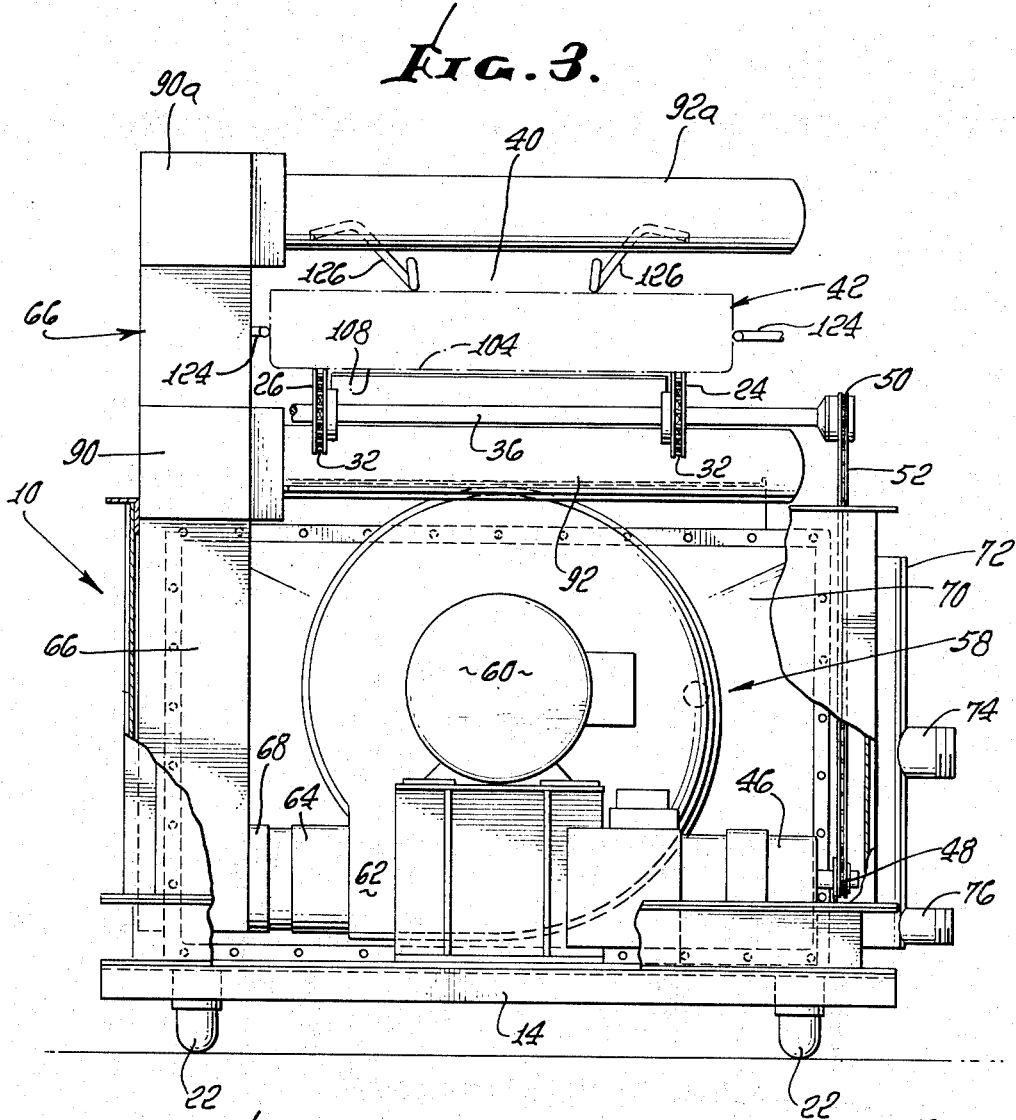
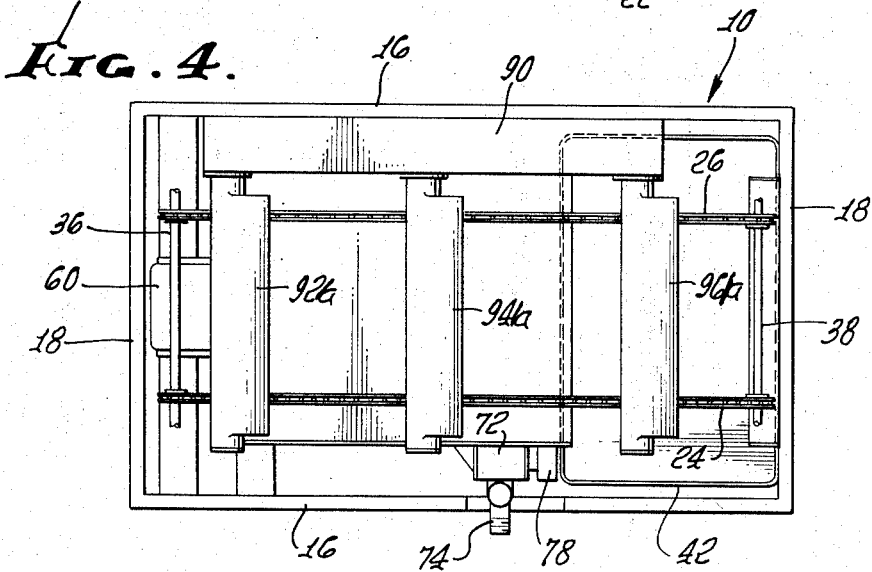

TRAY DRYING APPARATUS

BACKGROUND OF THE INVENTION

This invention has to do with tray drying apparatus. More particularly, the invention is concerned with improvements in the rapidity and efficiency of drying bread trays and like boxes and lugs which have relatively high sidewalls and generally perforate or reticulated bottoms.

The present invention is particularly aimed at a problem in bakery bread trays, but the solution arrived at is applicable to numerous areas where rapid and complete drying of just washed lugs or the like is needed. In the bakery application, the need for the present apparatus arises out of the twin considerations of cleanliness and quick turnaround required of the trays used for delivery of bread, rolls, buns and other baked goods from the commercial bakery to the food stores. In present practice, the trays are loaded with plastic-wrapped loaves and the several trays stacked in a truck and delivered. The trays may then be used to carry the bread loaves into the store for stocking shelves. Thereafter, the trays are returned empty to the bakery. Here they must be washed before reuse, to remove residual flour, dirt, grease, broken package litter and other debris. The trays are sent through a washing apparatus for this purpose. On emerging from the washing apparatus the trays are likely still wet or very moist. If bread is immediately placed in such trays, the excessive moisture on the tray bottom and walls can cause mildew, as the plastic wrapped bread is delivered. To lower their investment in trays, and thus keep bread prices down, bakeries try to maximize the daily trips of these trays. Thus, there is a need for apparatus to instantly dry washed trays for immediate reuse.

PRIOR ART

Many apparatus for drying box like objects have been made, but none to my knowledge which affords the several features hereinafter described. The present apparatus has been constructed and evaluated with good results.

SUMMARY OF THE INVENTION

It is a major objective of the invention to provide apparatus which dries bread trays and like high sidewall, open pattern bottom lugs quickly, by removal of water positively and without undue and expensive reliance on heat to evaporate water, and by entraining air removed against redeposition on the tray to be dried on those in front of or behind it.

As used herein "water" is intended to be inclusive of aqueous solutions, e.g., with soap or the like. The term "drying" herein refers to removal of liquid water from surfaces.

The foregoing objective and others to be made known hereinafter, are met in accordance with the present invention with an apparatus for drying rinse water accumulations from trays having bottom openings, which comprises an elongated frame defining a path for trays to be dried, conveyor means carrying the trays along the path in bottom-exposed relation, and a drying stage comprising means to pass air simultaneously through and along the tray bottom within the frame, including first nozzle means impinging air on the inner tray bottom to entrain the accumulated water and a second nozzle means impinging air on the outer tray bottom and angularly to the plane of the first nozzle air, to deflect water entraining air emerging from the bottom openings across and away from the tray bottom, to dry the tray. In specific embodiments, the apparatus may further include: means to heat the drying stage air in advance of nozzle delivery; successive drying stages arranged longitudinally of the tray advancement path; a common pressurized air supply to the first and second nozzle means, e.g., a blower defining the air supply means; and means pressure communicating the inlet or suction side of the blower with deflected water-entraining air in the drying stage of the apparatus.

More specifically, the invention contemplates apparatus as described, and in which: the first nozzle means and the second nozzle means each comprise a slot opening extending generally transversely of the tray advancement path; the plane of the first nozzle air intersects the plane of the second nozzle air along a horizontal line within the plane of the bottom of the tray to be dried; the second nozzle means is arranged to impinge an air stream on the tray bottom countercurrently to the tray travel direction; the blower is arranged to supply pressurized air to the first and second nozzle slots; means is provided to communicate blower suction to the outer tray bottom to withdraw water-entraining air therefrom; and means is provided to remove water from the air thus withdrawn, prior to the blower recirculating the air to the nozzle slots; successive drying stages arranged longitudinally of the tray advancement path and means to withdraw water-entraining air from between successive stages including means communication the interstage spaces with the blower suction side, and means to remove water therefrom including a heater for the withdrawn air and means defining an arcuate air flow path for the withdrawn air adapted to centrifugally separate contained water from the withdrawn air.

The nozzle slots may be horizontal and canted relative to the tray advancement path and each at the same angle of cant.

The trays are typically carried open end up (bottom down) and there may be provided spaced parallel chain conveyor means supporting the trays for advancement along the path, a second nozzle means being located below the conveyor chains and spaced no more than a mechanical clearance from the conveyor.

BRIEF DESCRIPTION OF THE DRAWINGS

The invention will be further described as to several illustrative embodiments in connection with the attached drawings in which:

FIG. 1 is a top plan view of apparatus according to the invention, partly broken away to show underlying parts;

FIG. 2 is a side elevation thereof taken on line 2—2 in FIG. 1, certain parts having been removed for clarity of illustration;

FIG. 3 is an end elevation showing the tray outlet end of the apparatus, and is taken on line 3—3 in FIG. 1; and FIG. 4 is a top plan view of a modified form of the apparatus.

Referring now to the drawings, the apparatus is shown in FIGS. 1 and 2, to include a generally rectangular metal frame 10 formed of lower longitudinal parallel frame members 12 and lower cross members 14, upper horizontal, longitudinal frame members 16 and upper cross members 18 and corner uprights 20, e.g., of angle iron or the like and welded or bolt fastened together. The frame 10 is supported on the floor by feet 22. A chain conveyor comprising spaced parallel conveyor chains 24, 26 is provided supported at the feed end 28 and take-off end 30 of the frame 10 by sprocket pairs 32, 34 carried on rotating shafts 36, 38, respectively, journaled outwardly of the sprockets in suitable supports (not shown). The frame 10 defines an advancement path 40 for passage of open bottomed or reticulated tray 42, the path being generally next above and parallel to the path of the chain conveyors 24, 26 upon which the tray is carried. Guide sprockets 44 are provided to guide the lower course of the conveyor chains.

Below the tray advancement path 40, there is provided an electric motor 46 geared to drive pulley 48 connected to pulley 50 on shaft 38 by means of belt 52 carried over roller 54 on shaft 56 to thereby drive the conveyor chains 24, 26 and advance the tray 42 from right to left through the apparatus.

A large centrifugal blower 58 is located below the path 40 carried on the frame 10 and comprising blower motor 60 having its outlet 64 connected to manifold 66 at 68 for purposes to appear and a blower intake 70 to which is secured a heater section 72 having an internal coil with steam inlet 74 and condensate outlet 76. A filter pad section 78 is provided ahead of the heater section 72. Air to the blower intake 70 is drawn from chamber 80 which is formed of sheet metal walls and surrounds the blower intake. The top of the chamber 80 is open at the feed end 28 of the apparatus and beneath the conveyor chains 24, 26, to provide an air passage at 83 to the chamber 80 between baffle 84 and the rightmost edge 86 of pan 88.

In accordance with the invention, the just described apparatus is provided with a special arrangement of air stream nozzles to direct the blower output of pressurized air onto the trays to be dried in a novel and highly drying-effective manner. Specifically, the manifold connected to the output of the blower 58 as described, distributes the air upwardly and laterally to six spaced locations, each having an air duct projecting outwardly from the manifold and each provided with a slot nozzle. As best shown in FIG. 2, the manifold 66 has a lower distribution head 90 carrying a series of lower ducts 92, 94, 96 below the tray path 40, and an upper distribution head 90a carrying a series of upper ducts 92a, 94a, and 96a, the upper ducts being paired with the lower ducts, e.g., upper duct 92a with lower duct 92, in generally opposed relation and transversely across the tray advancement path 40. The transverse disposition of the duct pairs may be in a plane normal to the advancement path 40, e.g., see FIG. 4, or in a canted plane as shown in FIGS. 1-3, e.g. between 5° and 20° from normal to the tray path 40. The ducts 92-96a are each provided with slot nozzle openings 98, 100, 102, 98a, 100a and 102a respectively, from which the pressurized blower air issues in a direction determined by the nozzle arrangement.

With reference initially to the upper nozzles 98a, 100a and 102a, each is aimed directly downward so as to be able to impinge an air stream essentially normally against the inner bottom wall surface 104 of the tray 42 to be dried. Water accumulation within the tray 42, located primarily on the inner bottom wall 104 is blasted off the tray and entrained in the air stream which of necessity passes through bottom wall openings 106. The water is thus taken from the interior surfaces of the tray 42.

The lower nozzles 98, 100 and 102 are arranged in a particular manner with respect to the outer bottom wall surface 108 of the tray 42 and with respect to the vertical air stream emerging, with water entrained from the bottom wall openings 106.

It will be observed that the lower nozzles 98, 100 and 102 are disposed angularly with respect to the outer tray bottom surface 108 and the plane of the downcoming air streams from upper nozzles 98a, 100a, and 102a. As best shown in FIG. 1, the air stream 110 from the lower nozzle 98 intersects the air stream 112 from the upper nozzle 98a at a point 114 (a line actually because of the sheet-like nature of the air stream from the slotted nozzles) within the plane defined by the upper bottom wall surface 104 and the lower surface 108 of the tray 42 and deflects the downward air stream. With its angled relation, the lower air stream 110 is nearly horizontal yet somewhat angled upward from the horizontal as shown in FIG. 2, to ensure a scavenging air blast across the outer bottom wall surface 108 of the tray 42. In this manner, the water-entraining air emerging from the bottom openings 106 and particularly a water droplet, is sheared off and carried along the tray bottom surface 108. The angle of lower nozzle 98, 100 and 102 to horizontal can range between 5° and 25°, and 15° is preferred.

The proximity of the lower nozzle, e.g. 102 to the tray bottom surface 108 is as close as practicable; a mechanical clearance, e.g., at 116 to permit interference free passage of the trays 42 is essential, but otherwise the nozzles 98, 100 and 102 are located at the outer bottom wall surface 108 and angled to be from 5° to 15° to the plane of the tray path 40.

The apparatus illustrated is arranged to have the tray 42 advance from right to left, and to have the lower nozzles 98, 100 and 102 direct air countercurrently to this movement. This results in a clockwise rotation of air beneath the tray bottom, see, e.g., nozzle 98 where this flow is schematically depicted as though a tray were located above the nozzle this air rotation carries the moisture away from the trays to effect rapid drying.

Plural drying stages are shown, defined by the nozzle pairs 98, 98a, 100, 100a and 102, 102a. More or fewer stages may be used. It is desirable to prevent moist air from traveling from one stage to another across the interstage spaces 118 and from redepositing on the tray being dried or a tray in front of or behind that tray. Accordingly, the apparatus provides for the removal of moisture laden air from the vicinity of the drying stages and particularly from the interstage spaces 118 by sucking this air into the chamber 80 through top wall opening 120 and thence into the blower intake 70 through filter 78 and heater 74. The downward sloping pan 88 guides the deflected downward stream and the horizontal air stream combined therewith to the opening 120 to chamber 80. Liquid present falls to the pan 88 and flows to the chamber 80. In addition, air is forcefully drawn around the arcuate path from below the conveyor at 122 into the chamber at 120, i.e., around wall edge 86, subjecting water entrained therein to centrifugal forces which act to throw water out of the air stream for collection at the bottom of chamber 80.

The embodiment shown in FIG. 4 is the same as that described above with the exception of the nozzle ducts being alined normally to the tray path 40. Like numerals are used for like parts, except that the ducts and nozzles have a 1 added thereto, e.g. duct 921a corresponds to duct 92a and so forth.

In operation, the trays are fed into the apparatus at 28 and carried along the path 40, by conveyors 24, 26, and guided by side rails 124 and top guide arms 126. The nozzles 98, 98a, 100, 100a, 102 and 102a jet air, as described above, to separate water from the tray surfaces; the moisture laden air is drawn into chamber 80 by the blower and after water separation therefrom the air is returned to the nozzles.

I claim:

1. Apparatus for drying rinse water accumulations from trays having bottom openings, which comprises an elongated frame defining a path for trays to be dried;

conveyor means carrying the trays along the path in bottom-exposed relation;
   a drying stage comprising means to pass air simultaneously through and along the tray bottom, said means including a first nozzle slot impinging air on the inner tray bottom to entrain the accumulated water and a second nozzle slot impinging air on the outer tray bottom countercurrently to the tray advance and angularly to the plane of the first nozzle air to deflect water-entraining air emerging from the bottom openings across and away from the tray bottom to dry the tray;
   a blower arranged to supply pressurized air to said first and second slots, means to communicate the blower inlet with the outer tray bottoms to withdraw water entraining air therefrom, and means to remove water from the air thus withdrawn in advance of blower recirculation of the air to the nozzle slots.

2. Apparatus according to claim 1 including also means to heat the drying stage air in advance of nozzle delivery.

3. Apparatus according to claim 1 including successive drying stages arranged longitudinally of the tray advancement path.

4. Apparatus according to claim 1 in which said first nozzle slot and said second nozzle slot each extend transversely of the tray advancement path.

5. Apparatus according to claim 1 in which said second nozzle slot is horizontal and canted relative to the tray advancement path.

6. Apparatus according to claim 5 in which said first nozzle slot is horizontal and canted at the same angle as the second nozzle slot relative to the tray advancement path.

7. Apparatus for drying rinse water accumulations from trays having bottom openings, which comprises an elongated frame defining a path for trays to be dried;

conveyor means carrying the trays along the path in bottom exposed relation;
   a drying stage comprising means to pass air simultaneously through and along the tray bottom, said means including a first nozzle slot extending transversely of the tray advancement path for impinging air on the inner tray bottom to entrain the accumulated water and a second nozzle slot extending transversely of the tray advancement path and arranged for impinging air on the outer tray bottom countercurrently to the tray travel direction and angularly to the plane of the first nozzle slot air to intersect the plane of said first nozzle slot air along a horizontal line within the plane of the bottom tray to be dried and deflect water entraining air emerging from the bottom openings across and away from the tray bottom to dry the tray; a blower arranged to supply pressurized air to said first and second nozzle slots;
   means to communicate the inlet of the blower to the outer tray bottoms to withdraw water-entraining air therefrom, and means to remove water from the air thus withdrawn, prior to the blower recirculating the air to the nozzle slots.

8. Apparatus according to claim 7 including successive drying stages arranged longitudinally of the tray advancement path, and in which said blower inlet communicating means is located between successive stages to communicate the interstage spaces with the blower inlet.

9. Apparatus according to claim 8 including a heater to heat the withdrawn air prior to recirculation thereof.

10. Apparatus according to claim 9 in which said blower inlet communicating means further includes means defining an arcuate air flow path for said withdrawn air adapted to centrifugally separate entrained water from said air.

11. Apparatus according to claim 10 in which said second nozzle slot is horizontal and canted relative to the tray advancement path.

12. Apparatus according to claim 11 in which the first nozzle slot is horizontal and canted at the same angle as the second nozzle slot relative to the tray advancement path.

13. Apparatus according to claim 12 in which the trays are carried open end up, and including also spaced parallel chain conveyor means supporting the trays for advancement along said path, said second nozzle slot being located below the conveyor chains and spaced no more than a mechanical clearance from the conveyor.

* * * * *